(12) United States Patent
Stegherr

(10) Patent No.: US 6,364,805 B1
(45) Date of Patent: Apr. 2, 2002

(54) PLANETARY GEAR

(75) Inventor: Rudolf Stegherr, Dachau (DE)

(73) Assignee: MTU Motoren- und Turbinen-Union Muenchen GmbH, Munich (DE)

( * ) Notice: Subject to any disclaimer, the term of this patent is extended or adjusted under 35 U.S.C. 154(b) by 0 days.

(21) Appl. No.: 09/555,413

(22) PCT Filed: Sep. 29, 1999

(86) PCT No.: PCT/DE99/03121

§ 371 Date: Jul. 17, 2000

§ 102(e) Date: Jul. 17, 2000

(87) PCT Pub. No.: WO00/19124

PCT Pub. Date: Apr. 6, 2000

(30) Foreign Application Priority Data

Sep. 30, 1998 (DE) ........................................ 198 44 843

(51) Int. Cl.⁷ .............................................. F16H 57/08
(52) U.S. Cl. ..................................................... 475/338
(58) Field of Search ................................. 475/338, 346, 475/331

(56) References Cited

U.S. PATENT DOCUMENTS

| | | | |
|---|---|---|---|
| 2,759,376 A | * | 8/1956 | Chamberlin et al. ......... 475/338 |
| 2,868,040 A | * | 1/1959 | Chamberlin ............ 475/338 X |
| 3,808,913 A | | 5/1974 | Gilbert et al. |
| 4,392,396 A | * | 7/1983 | Sato et al. ..................... 74/785 |
| 5,310,391 A | * | 5/1994 | Takahashi ................... 475/338 |
| 5,409,430 A | * | 4/1995 | Hashimoto et al. .......... 475/331 |
| 5,466,198 A | * | 11/1995 | McKibbin et al. .......... 475/346 |
| 5,779,587 A | * | 7/1998 | Reilly .................... 475/338 X |

FOREIGN PATENT DOCUMENTS

| | | | | |
|---|---|---|---|---|
| DE | 2239062 | | 2/1973 | |
| EP | 0388207 | | 9/1990 | |
| GB | 733800 | * | 7/1955 | ................. 475/338 |
| GB | 804223 | | 11/1958 | |
| GB | 1131962 | | 10/1968 | |
| JP | 08-135741 | | 5/1996 | |

* cited by examiner

*Primary Examiner*—Charles A Marmor
*Assistant Examiner*—Roger Pang
(74) *Attorney, Agent, or Firm*—W. F. Fasse; W. G. Fasse

(57) ABSTRACT

A planetary gear arrangement includes a gear housing, a first shaft and a second shaft located coaxially opposite each other, an internal geared wheel, a sun wheel torsionally fixedly connected to the first shaft, a planet carrier that forms a rotatably supported constructional unit together with the second shaft, and several step planets that are rotatably supported in the planet carrier. Each step planet includes two connected planet wheels with different effective diameters, whereby the larger planet wheels intermesh with the sun wheel, and the smaller planet wheels intermesh with the internal geared wheel. Each planet wheel is arranged as a separate unit and is rotatably supported on both sides in the planet carrier respectively via at least one roller bearing, with high stability under load. The two planet wheels of each step planet are coupled to each other in a torsionally fixed manner via an additional shaft that engages each planet wheel in a positive-locking manner in the circumferential direction.

11 Claims, 1 Drawing Sheet

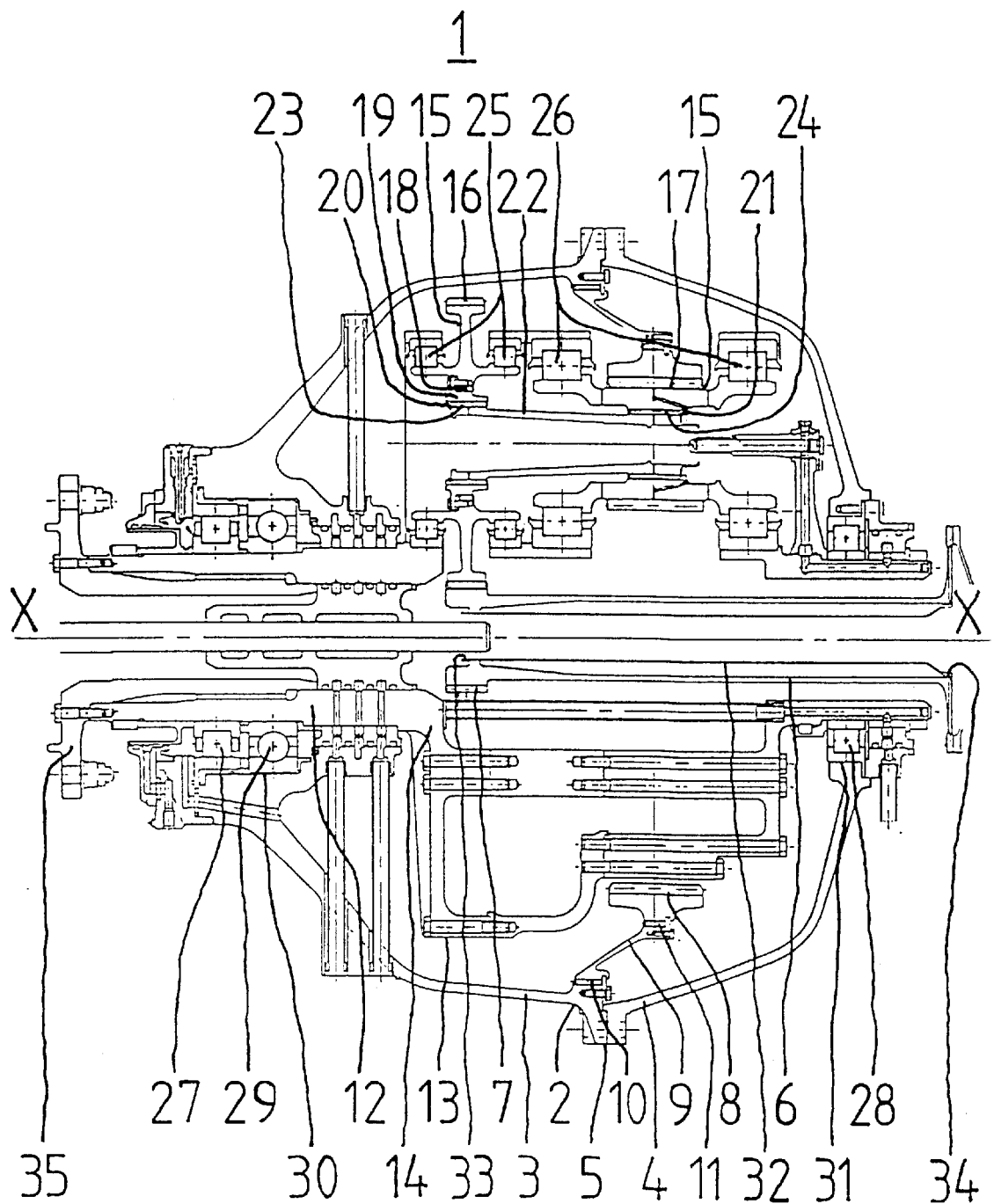

PLANETARY GEAR

FIELD OF THE INVENTION

The invention relates to a planetary gear made of gearwheels, comprising a sun wheel on a first shaft, a planet carrier on a second shaft, an internal geared wheel on the gear housing or on a third shaft, and step planets, each with two planet wheels of different sizes, interconnected in a torsionally secured or fixed manner, of which wheels the smaller planet wheels intermesh with the internal geared wheel and the larger planet wheels with the sun wheel.

BACKGROUND INFORMATION

Planetary gears with step planets are well known, they are for example used as propeller gearing in the Rolls-Royce aircraft engine "Tyne". Compared to a single stage planetary gear with simple planets, i.e. wheels with an effective diameter intermeshing with the sun wheel and the internal geared wheel, with a modest increase in the volume of the gearing and somewhat increased design expenditure, the step planet design allows a significant increase in the transmission ratio, with the shaft torque largely increasing in the same ratio. In the known designs, the two wheels of the step planet are axially directly adjacent to each other as well as connected to form an integral unit, i.e. they are usually made in one part.

Rotary bearing of such integral step planets is usually via one or several plain bearings (slide bearings) in the interior of each of these components as well as via a rigid planet carrier axis leading through the step planet. In the case of roller bearings, one bearing each is provided axially in front of and behind the step planet, because usually the radially larger roller bearings cannot be accommodated in the interior of the planet wheels, especially the smaller planet wheels.

If the two gearing characteristics of a step planet are projected in axial direction in one plane and if the tooth forces resulting from the pressure with the sun wheel and the internal geared wheel ($1^{st}$ and $2^{nd}$ stage) are analysed according to size and direction, then it becomes evident that the two tooth forces point in the same general direction with the acute angle between their vectors corresponding to the sum of the two pressure angles (approx. 40° to 50°). If the two tooth forces are vectorially added, we arrive at a resultant force significantly higher than that of each of the individual forces. From the point of view of construction this means that the step planet design leads to high bearing forces so that the carrying capacity of the step planet bearings becomes a decisive criterion for the power that can be transmitted by the gearing. Additional loading of the bearings results from the speed-related centrifugal forces acting on the step planets. In this context it must also be taken into account that propeller gearing is to be designed for a service life of for example 30,000 h, which of course also applies to the roller bearings installed.

SUMMARY OF THE INVENTION

It is thus the object of the invention to modify planetary gears with step planets in such a way that with only a slight increase in design volume and construction expenditure (number of parts etc.) at a specified transmission ratio, significantly higher power can be transmitted at the best possible efficiency.

The above objects have been achieved according to the invention in a planetary gearing arrangement that generally includes the components and features mentioned above in the Field of the Invention section, as well as the further special features of the invention to be described next.

Each planet wheel is constructed as a separate unit which is rotatably held on both sides, i.e. axially in front of and behind its center plane, in the planet carrier, in each case via at least one roller bearing with high stability under load. Thus for each step planet there are four large-dimension bearing positions with high stability under load, ensuring minimal friction losses. Each bearing position may comprise several individual roller bearings axially one behind the other. The two planet wheels of each step planet are coupled to each other by an additional (fourth) shaft in a manner that is torsionally fixed or secured, but allows limited relative radial and axial movement. Thus, torque transmission from the large to the small planet wheel of each step planet is by positive locking via the additional shaft which is practically only subjected to torsional load. This bridges the axial spacing, increased according to the invention, between the coupled planet wheels of various sizes. Thus the gear according to the invention can also be referred to as a planetary gear with coupled stage planets.

BRIEF DESCRIPTION OF THE DRAWINGS

Below, the invention will be described in connection with a drawing, the single FIGURE of which shows a longitudinal center section of a planetary gear intended as a propeller gear for a large aircraft.

DETAILED DESCRIPTION OF THE INVENTION

The planetary gear arrangement 1 shown in the drawing represents an at least largely rotation-symmetrical structure comprising a horizontal longitudinal center axis X. The propeller (not shown) arranged at the front in the direction of flight, would be arranged on the left while the driving turboshaft gas turbine (also not shown) or its compressor inlet would be arranged on the right of the planetary gear 1. Thus in this diagram left means front and right means rear. The "normal" power-flow in pulling operation is thus from right to left through the planetary gear 1. The mechanical functional elements of the oil-lubricated gear are surrounded by a sealed-off gear housing 2. On the drive side (right), a first shaft 6 leads into the gear housing 2. On the driven side (left), a second shaft 12 with a propeller flange 35 leads out of the gear housing 2. The gear housing 2 comprises a front shell 3 and a rear shell 4 with a flange connection 5 in a plane perpendicular to the longitudinal center axis. In the diagram, the rear shell 4 is shown as a separate component but, together with the movable bearing 31, it could alternatively be integrated in the compressor inlet housing, i.e. it could be formed by the compressor inlet housing.

As the only non-rotating gear, the internal geared wheel 8 is connected to the gear housing 2 so as to be torsionally fixed thereto, thus forming a moment support for the rotating gear elements. The special support of the internal geared wheel 8 by way of a thin-walled support 9, conically widening towards the front, and two straight/axial gearing arrangements 10, 11, results overall in a certain radial elasticity as well as a minimal ball and socket type mobility of the internal geared wheel 8 around its center while maintaining unimpeded torsional fixing. This adaptability ensures an optimal contact pattern of the internal geared wheel gearing and the counter gearing, thus maximizing the transmittable power.

Under torsional load, the gearing arrangements 10 and 11 should, if at all possible, generate no axial forces, an objective best achieved with straight toothing. In view of increased angular mobility, the gearing 11 could also be designed in the form of curved toothing with the center being formed by the center of the internal geared wheel.

For driving two counter-rotating propellers, the internal geared wheel could also be coupled in a torsion-resistant (i.e. torsionally secured) way to a third coaxial shaft not shown).

In particular the lower half of the FIGURE shows that the planet carrier 13 forms a unit 14 with high stability under load and a broad bearing base with the second shaft 12. The roller bearing arrangement of this unit 14 is a fixed-loose (movable) bearing arrangement, with the fixed bearing 30 in the region of the housing end facing the propeller; and with the movable bearing 31 located in the region of the housing end facing the engine. The fixed bearing 30, which must also absorb the axial forces generated by the propeller, is made to be particularly stable and fail-safe by being a combination of a roller bearing 27 and a ball bearing 29, if need be, in the form of a so-called four-point bearing. A roller bearing 28 is provided for the movable bearing 31 which only experiences radial load and is not stressed as much. The cage-like planet carrier 13 is designed as a screw construction with mutually centering design elements so that the cogs, bearings and shafts borne by it can be quickly and simply installed and uninstalled, e.g. for purposes of inspection, maintenance or exchange.

The first shaft 6, which carries the sun wheel 7 and which in the region of the gearing does not have a bearing, is characterized by incorporating a device for measuring the input torque. To this purpose, the interior of the first shaft 6 comprises a meter tube 32 concentrically housed in such a way that one of its ends 33 is connected to the first shaft 6 so as to be rotationally rigid therewith, while its other end 34 is guided in the first shaft 6 so as to be centered and freely movable. Under load, the first shaft 6 is under torque; by contrast the meter tube 32 which is not exposed to any load, does not experience any deformation. In this way the relative torsion between the first shaft 6 and the free end 34 of the meter tube 32 can be sensed or acquired and mathematically converted to a torque value. This measured value can now be used for regulating the engine to avoid overloading the gearing and the propeller. The sun wheel 7 intermeshes with several, for example three, identical planet wheels 16 which are elements of so-called step planets 15. Each step planet 15 comprises two planet wheels 16, 17 that are connected to each other so as to be torsion-resistant (i.e. torsionally fixed to each other), with very different effective diameters/reference diameters. The sun wheel 7 intermeshes with the larger planet wheels 16 while the smaller planet wheels 17 intermesh with the internal geared wheel 8. According to this principle, transmission ratios exceeding 10:1 can be realized with the use of only one sun wheel and only one internal geared wheel.

In the present case the special characteristics consist of each planet wheel 16, 17 being constructed as a separate unit and on both sides, i.e. axially in front of and behind the centre plane of its wheel, being rotatably held in the planet carrier 13 by way of roller bearings with high stability under load. Preferably this is a "floating" mounting of symmetrical arrangement with two identical roller bearings each. In view of a uniform design life, the roller bearings are adapted to the gearing forces which is why the roller bearings 26 on the "exit side" are of noticeably stronger build than the roller bearings 25 on the "input" side. Floating mounting with radial bearings and little axial play of the wheels is possible in that all intermeshing gearing arrangements are free of axial forces, i.e. no single helical gearing is used. When compared to plain bearings, roller bearings provide an advantage in that they can be exposed to full load even at low speeds/differential speeds and in that generally they operate at higher efficiency, i.e. less loss performance, in particular at low ambient temperatures such as occur during flight at high altitudes.

The arrangement of the gearwheel planes in the planetary gear 1 is a characteristic which from the point of view of performance flow seems to be rather unfavorable. The sun wheel 7 and the larger planet wheels 16, which here form the input stage, are not arranged toward the engine but instead toward the propeller (farther to the left). By contrast the smaller planet wheels 17 and the internal geared wheel 8 which form the output stage are positioned closer to the engine (farther to the right). In the present case this arrangement was intentionally selected to make it possible to design the planetary gear 1 with an external contour tapering off toward the engine (right side) and thus to improve the inlet conditions for the turboshaft gas turbine, i.e. to allow a more favorable flow. Of course, within the scope of the invention, the conventional inverse arrangement of stages is alternatively possible.

Construction of each planet wheel 16, 17 as a separate functional element with roller bearings on both sides, requires within each step planet 15 an additional mechanical coupler link for torque/power transfer from wheel to wheel. To this purpose, additional torsionally rigid shafts 22 are installed which in circumferential direction intermesh in a positive lock with the planet wheels 16, 17. To this effect each shaft end comprises an external straight tooth arrangement 23, 24; each wheel comprises an internal straight tooth arrangement 20, 21. The gearing 20, 23, 21, 24 is free of axial forces and, if fitted with some play, allows minimal angular deviations, i.e. radial displacement of the wheels without any constraining forces. Thus the shafts 20 are practically exclusively exposed to torsional forces; they can be made from high strength materials with relatively thin walls, including hollow shafts. The ability to withstand loads can be further increased by incorporating such shaft gearing in the oil lubrication system of the gearbox. This ensures a high degree of resistance to wear and additional damping at the teeth.

A further performance-optimizing advantage is achieved in that prior to placing the arrangement into operation, the angle of the planet wheels 16, 17 can be slightly adjusted and fixed in relation to each other so as to achieve optimal intermeshing of the toothwork. To this effect, each larger planet wheel 16 comprises a catch 19 as a transmission member between the wheel and the shaft. On the side of the shaft, the catch 19 carries the already mentioned internal straight tooth arrangement 20. Helical gearing 18 provides the power transmission to the wheel body. Thus by axial movement of the catch 19 relative to the wheel body, compulsory relative rotation between wheel and catch, and thus between wheel and shaft, is achieved. Fixing the axial position takes place by screwing a flange on the catch 19 to the face of the wheel body, with one or several shims of suitable thickness (axial measure). If the helical gear arrangement 18 is at a small angle, only small loads act on the screws during operation.

As already mentioned, all intermeshing gearing with changing tooth pressure should operate free of any axial force, irrespective of the shaft toothwork which is always engaged with all teeth. Of the involute toothing which is practically used without exception, straight toothing, cogged gearing, herringbone gearing and double helical gearing are suitable. In the case of herringbone gearing, the teeth directly touch at the "point of the arrow" whereas in the case of double helical gearing there is an axial gap between the symmetrically arranged helical teeth which has advantages from the point of view of production technology. The expert is well aware of the advantages and disadvantages of these variants both from the point of view of operation and production technology.

For other applications of a planetary gear according to the invention, the power flow can also be reversed or modified within the scope of all kinematic possibilities provided by designs using two or three coaxial shafts.

What is claimed is:

1. A planetary gear arrangement of gearwheels, comprising:

a gear housing;

a first shaft;

a second shaft arranged coaxially opposite said first shaft;

an internal geared wheel that is torsionally fixedly connected to said gear housing or to a third coaxial shaft;

a sun wheel that is torsionally fixedly connected to said first shaft;

a planet carrier that forms, together with said second shaft, a structural unit that is rotatably supported at at least two axially spaced-apart positions; and a plurality of identical step planets, each of which comprises a larger planet wheel (16) having a relatively larger effective diameter and intermeshing with said sun wheel, a smaller planet wheel (17) having a relatively smaller effective diameter and intermeshing with said internal geared wheel and being a separate structure relative to said larger planet wheel, at least one respective highly loadable roller bearing (25, 26) arranged respectively on both sides axially in front of and axially behind a center plane of each respective one of said planet wheels (16, 17), and an additional shaft (22) that torsionally fixedly couples said larger planet wheel and said smaller planet wheel to each other while allowing limited axial and radial movement relative to each other, wherein said additional shaft (22) engages each said planet wheel (16, 17) in a positive form-locking manner in a circumferential direction.

2. The planetary gear arrangement according to claim 1, wherein all of said bearings are respective lubricated roller bearings, each said planet wheel (16, 17) is symmetrically retained in two of said roller bearings (25, 26), and said structural unit (14) of said planet carrier (13) and said second shaft (12) further comprises a fixed-loose bearing arrangement with a fixed bearing (30) on one side and a movable bearing (31) on another side opposite said one side of the planet carrier (13), with said fixed bearing (30) absorbing axial forces and comprising a first ball bearing (29) and a first roller bearing (27) in axially adjoining arrangement, and with said movable bearing (31) comprising a second roller bearing (28).

3. The planetary gear arrangement according to claim 1, wherein said sun wheel, said internal geared wheel, and said planet wheels respectively comprise and intermesh via at least one of straight toothing, herringbone gearing, double helical gearing, cogged gearing, and involute toothing.

4. The planetary gear arrangement according to claim 1, wherein said additional shafts (22) respectively coupling said larger and smaller planet wheels (16, 17) respectively comprise two external straight tooth arrangements (23, 24), each of said planet wheels (16, 17) respectively comprises an internal straight tooth arrangement (20, 21) fitting into a respective one of said external straight tooth arrangements with a small radial play, each one of said larger planet wheels (16) respectively comprises a planet wheel body and a catch (19) that include a helical gearing (18) therebetween, said internal straight tooth arrangement being worked into said catch (19) which intermeshes with said planet wheel body of said larger planet wheel (16) via said helical gearing (18), and an adjustment of an axial position of intermeshing of said helical gearing effectuates a rotational adjustment of said catch in a circumferential direction relative to said planet wheel body of said larger planet wheel (16).

5. The planetary gear arrangement according to claim 1, further comprising a conical carrier (9) with a first carrier gearing toward said gear housing (2) and a second carrier gearing toward said internal geared wheel (8), wherein said conical carrier carries said internal geared wheel in the manner of a ball and socket joint, so that said internal geared wheel is swivellable about a center thereof and radially yielding within narrow limits, yet in a torsionally fixed manner.

6. The planetary gear arrangement according to claim 1, further comprising a coaxial meter tube (32) that is arranged coaxially in or on said first shaft, and that has a first fixed end (33) which is connected in a torsionally fixed manner to said first shaft (6) and a second loose end which is not connected to said first shaft in a torsionally fixed manner, so that a relative torsion arising between said loose end (34) of said meter tube (32) and said first shaft (6) represents a measure for establishing torque.

7. The planetary gear arrangement according to claim 1, further in combination with and for power transfer with speed reduction between a turboshaft gas turbine and a propeller, wherein said smaller planet wheels (17) and said internal geared wheel (8) are arranged axially closer to said gas turbine than are said larger planet wheels (16) and said sun wheel (7).

8. The planetary gear arrangement according to claim 7, further comprising a conical carrier (9) with a first carrier gearing toward said gear housing (2) and a second carrier gearing toward said internal geared wheel (8), wherein said conical carrier carries said internal geared wheel in the manner of a ball and socket joint, so that said internal geared wheel is swivellable about a center thereof and radially yielding within narrow limits, yet in a torsionally fixed manner, and wherein said conical carrier (9) expands conically larger toward said propeller.

9. The planetary gear arrangement according to claim 1, wherein said gear housing (2) comprises two shells (3, 4) with a flange connection (5) therebetween, with a joint face of said flange connection being arranged transversely to said first and second shafts (6, 12).

10. The planetary gear arrangement according to claim 9, further in combination with and for power transfer with speed reduction between a turboshaft gas turbine and a propeller, wherein said turboshaft gas turbine includes a compressor inlet housing, and said rear shell (4) of said gear housing (2) is integrated with said compressor inlet housing of said turboshaft gas turbine.

11. The planetary gear arrangement according to claim 1, wherein all of said bearings are respective lubricated roller bearings, and each said planet wheel (16, 17) is symmetrically retained in two of said roller bearings (25, 26).

* * * * *